Sept. 11, 1962   G. M. FLYNN   3,053,213
JET FLUXING APPARATUS
Filed Nov. 17, 1959   2 Sheets-Sheet 1
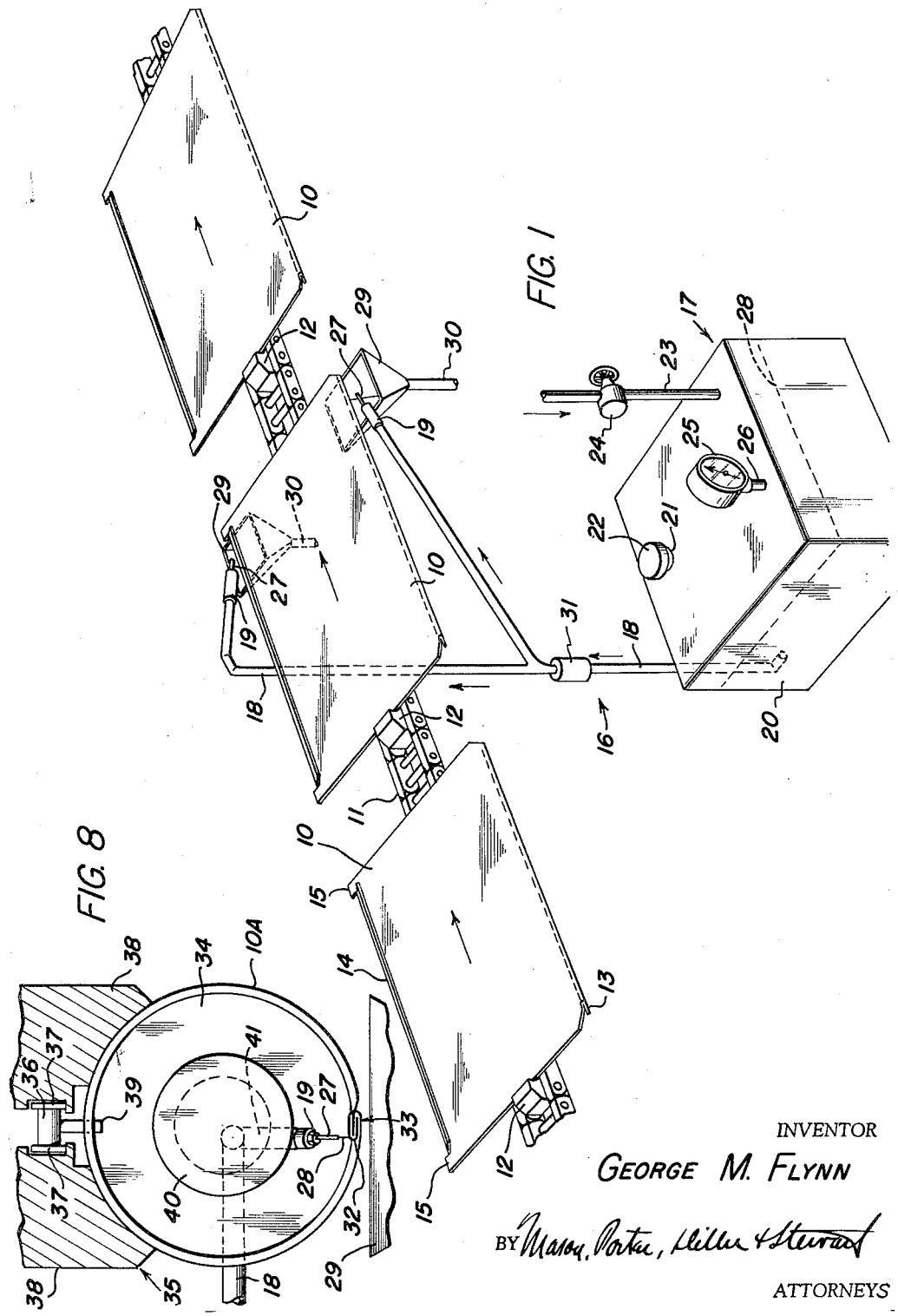
INVENTOR
GEORGE M. FLYNN
ATTORNEYS Sept. 11, 1962  G. M. FLYNN  3,053,213
JET FLUXING APPARATUS
Filed Nov. 17, 1959  2 Sheets-Sheet 2
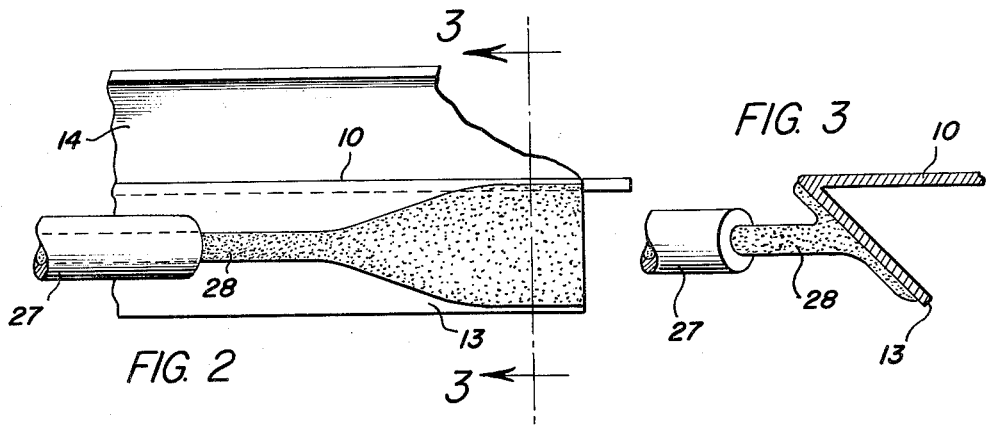
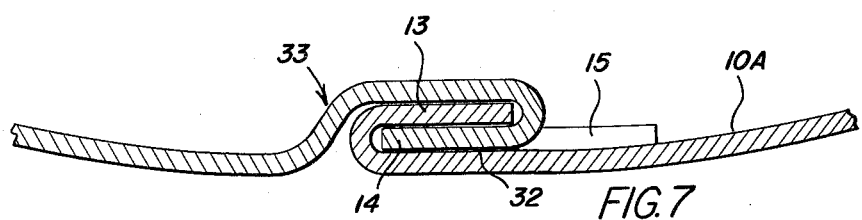
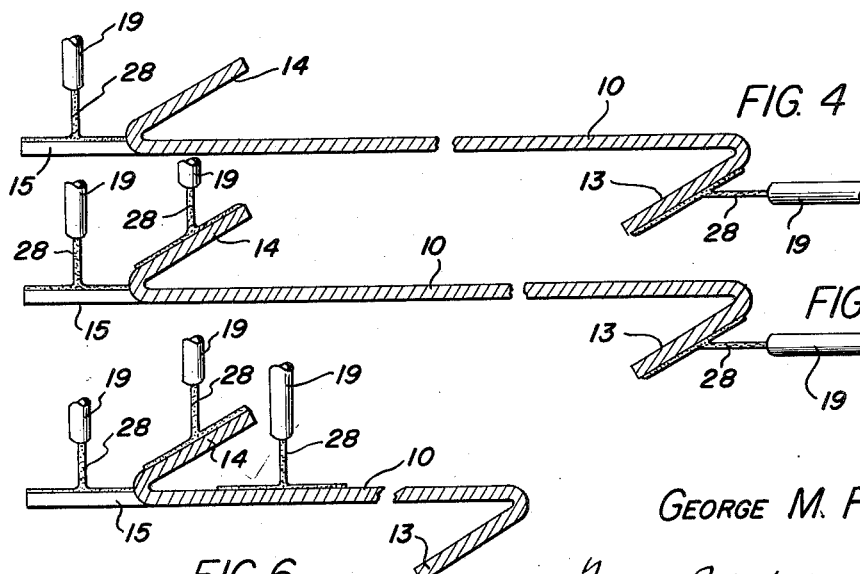
INVENTOR
GEORGE M. FLYNN
ATTORNEYS

United States Patent Office 3,053,213
Patented Sept. 11, 1962

3,053,213
JET FLUXING APPARATUS
George M. Flynn, Chicago, Ill., assignor to Continental Can Company, Inc., New York, N.Y., a corporation of New York
Filed Nov. 17, 1959, Ser. No. 853,527
7 Claims. (Cl. 113—95)

This invention relates in general to the art of soldering can body seams, and particularly relates to a novel apparatus for applying the minimum of liquid flux needed to solder the seam which is subsequently formed between the edges of the body blank.

In the forming of a can body, the can body blank is first shaped to provide the necessary flanges and laps. A liquid soldering flux is then applied to the appropriate portions of the flanges and laps of the can body blank. The flanges are then interhooked, after which the flanges and laps are bumped together, and soldered to form a sealed seam between the edges of the can body blank. A less common commercial practice is to apply the liquid soldering flux to the seam formed between the edges of the can body blank after said bumping and prior to said soldering thereof, by means of flux applicators positioned inside or outside of the formed can body.

At the present time, commercial flux applicators operate on the principle of transferring the liquid flux from an open reservoir by way of an intermediate solid transfer surface, such as rolls or brushes. Experimentation has shown that the optimum amount of flux applied to one edge of a body blank is in the form of a film having a thickness of approximately .0003 inch. The present commercial flux applicators apply about four times this quantity of flux under the best conditions of operation. This application of excess flux by commercial flux applicators is unavoidable because the physical properties (adhesion, surface tension and related phenomena) controlling the transfer of commercial liquid flux from the intermediate solid transfer surface to the surface of the body blank are such that it is impossible to obtain the prerequisite, critically thin flux film of .0003 inch thickness. The extensive web of liquid flux which bridges between a roll applicator and the passing body blank in commercial operations attests that the application of an excess of flux is unavoidable. Similarly, outside roll fluxing of bumped seams, despite obvious inherent advantages, has proven even less satisfactory because the increased can body area contacted by the flux web results in a still greater excess of applied liquid flux.

When an excess of liquid flux is applied to the appropriate body blank surfaces (the flanges and laps), and the body blank passes through the subsequent interhooking, bumping and soldering operation, the excess flux spatters into the interior of the can body being formed. When an excess of liquid flux is applied after the seam is bumped, the excess of flux adhering to the exterior of the formed can body is violently vaporized by contact with the molten wide area. In the case of an enameled body blank, the protective enameled coating is impaired; and, in the case of plain body blanks, the tin coating is destroyed by the spattered flux. The excess of flux is, of course, a direct monetary loss, and the corrosion of the bodymaker, by the spattered flux, increases repair costs. Additional expense arises when using the commercial brush type flux applicators as they become worn by contact with the appropriate body blank surfaces, and frequent adjustment and replacement of the brush applicators is unavoidable. Similarly, because the peripheral speed of the commercial roll type flux applicator must be approximately the same as the speed of the body blank and the centrifugal force acting upon the flux carried by said roll applicator is a limiting factor, the diameter of the roll applicator must be changed in correspondence with any appreciable change in the speed of the body blank. Additionally, because commercial flux applicators subject the liquid flux to considerable agitation, and because the flux reservoir is open to the atmosphere it is impractical to utilize more volatile liquid soldering fluxes which are otherwise preferable.

An object of the present invention is to provide a jet fluxing apparatus which will apply to the appropriate body blank surfaces either before or after the interhooking and bumping thereof, the minimum amount of liquid flux needed for the subsequent soldering thereof; any flux in excess of said minimum resulting in both a monetary loss and inferior quality can bodies.

Another object of the invention is to provide an apparatus which will apply the required amount of liquid flux directly to the appropriate body blank surfaces without the employment of an intermediate solid surface to transfer the flux from the flux reservoir to the appropriate body blank surfaces.

Another object of the invention is to provide an enclosed apparatus which will apply the required amount of liquid flux without the loss of volatile constituents prior to the application of said flux to the appropriate body blank surfaces.

A further object of the invention is to provide an apparatus which will apply the required amount of liquid flux at any delivery speed in exact correspondence with any desired, practical bodymaker speed by a mere resetting of a pressure regulating valve.

Still another object of the invention is to provide an apparatus which will apply only the requisite thin film of liquid flux to the appropriate body blank surfaces such that no flux is spattered from between said body blank surfaces in the subsequent bumping operation.

A still further object of the invention is to provide an apparatus for applying liquid flux to the appropriate body blank surfaces, the apparatus including a pressurized source of liquid flux, and flux applying nozzles which direct the flux toward said body blank surfaces in the form of a tenuous liquid stream, such that only the minimum amount of flux needed to subsequently solder said body blank surfaces is applied.

Another object of the invention is to provide an apparatus for applying liquid flux to the appropriate body blank surfaces in the form of a tenuous liquid stream such that, as the liquid stream becomes impinged upon said body blank surfaces, the adhesive force acting between the applied liquid flux and said body blank surfaces is greater than the gravitational force acting upon the applied liquid flux. This unbalance between said adhesive and gravitational forces causes all of the applied liquid flux to be retained upon the appropriate body blank surfaces; thus, there is no subsequent liquid flux run-off to drip down upon and corrode the underlying bodymaker machinery. Similarly, when the interhooked and overlapped appropriate body blank surfaces are subsequently bumped together, a capillary force is created which further contributes to the retention of the applied liquid flux upon the appropriate body blank surfaces. Hence, no flux is spattered out, when said body blank surfaces are bumped together, in said bumping operation, to degrade the quality of the can bodies and damage the surrounding bodymaker machinery.

A further object of the invention is to provide an apparatus for applying a tenuous stream of flux to the appropriate body blank surfaces for the purpose of obtaining a very thin film of liquid flux upon said surfaces, the apparatus including a pressurized source of liquid flux and flux applying means including a small diameter nozzle having a diameter ranging from .004 inch to .015 inch, so that only the required amount of liquid flux is applied to the appropriate surfaces of the body blank as it travels past the nozzle.

A still further object of the invention is to provide an apparatus for applying a very thin film of liquid flux to the appropriate body blank surfaces, the apparatus including a pressurized source of liquid flux, a liquid flux supply line extending from the pressurized source, and a flux applying nozzle connected to the liquid flux supply line, the nozzle being of an extremely small diameter, the liquid flux supply line having a filter therein to prevent clogging of the nozzle, and the pressurized flux source including a pressurized tank in which the liquid flux is placed and an air supply line connected to the tank and provided with a pressure regulating valve so that the pressure within the pressurized tank remains constant at all times once the valve is adjusted.

With the above and other objects in view that will hereinafter appear, the nature of the invention will be more clearly understood by reference to the following detailed description, the appended claims, and the several views illustrated in the accompanying drawings.

In the drawings:

FIGURE 1 is a schematic perspective view showing the flux applying apparatus in relation to a conveyor for can body blanks which have the necessary flanges and laps formed thereon;

FIGURE 2 is an enlarged fragmentary elevational view showing one of the flux applying nozzles directing a stream of flux onto one of the body blank flanges;

FIGURE 3 is an enlarged fragmentary elevational view taken on line 3—3 of FIGURE 2 showing the tenuous stream of flux being directed onto the body blank flange and the manner in which the stream of flux spreads out so as to cover the body blank flange with a very thin film of flux.

FIGURE 4 is an enlarged vertical sectional view through a can body blank, and shows further the application of flux to the flanges and laps thereof by the flux applying nozzles;

FIGURE 5 is a sectional view similar to FIGURE 4 and shows a different arrangement of flux applying nozzles;

FIGURE 6 is another vertical sectional view on a large scale through a body blank, and shows still another arrangement of flux applying nozzles for applying flux thereto;

FIGURE 7 is a section taken transversely through the side seam after the flanges have been interhooked and bumped; and FIGURE 8 is a transverse sectional view through a can body conveying means which conveys can bodies after the side seam flanges have been interhooked and bumped and shows a flux applying nozzle directing a stream of flux into the interior opening of the side seam as the can body is being conveyed.

The main embodiment of the invention is best illustrated in FIGURE 1. For the purpose of the present invention, body blanks, referred to by the numeral 10, are illustrated as being moved along a line by means of an endless conveyor 11 having lugs 12 at spaced intervals, which lugs 12 engage rear edges of the blanks 10 to move the blanks 10 along the line of the endless conveyor 11.

Each of the blanks 10 has passed through the hook forming stage of the can body forming machine and is provided along one edge thereof with a downwardly and inwardly turned flange 13 and along the opposite edge thereof with an upwardly and inwardly turned flange 14, the flanges 13 and 14 terminating short of the ends of the body blank 10 and there being present at each end of the flange 14 laps 15 which lie in the original plane of the body blank 10.

In a conventional can body forming operation, flux is applied to the undersurface of the flange 13, as it appears in FIGURE 1, the upper surface of the flange 14 and the upper surface of the laps 15. The blank 10 is then shaped into a tubular can body 10A (see FIG. 8) and the flanges 13 and 14 are interhooked. Next, the interhooked flanges are bumped so as to flatten the flanges and thus form a longitudinal seam generally referred to at 33 in the can body which is being formed from the blank 10, said seam having a serpentine interstitial space 32 which receives solder and is best shown in FIG. 7. Finally, solder is deposited into the seam to form a sealed and interlocked seam along the full length of the can body.

During the normal bumping operation, when excess flux is present, the excess flux will be squeezed out of the seam being formed with a spattering action, and the flux will be deposited on the interior of the can body, thus destroying or damaging the finish thereof. Presently available flux applicators will not place the flux in a sufficiently thin film to prevent this spattering of excess flux. It has been found that a flux film having a thickness of approximately .0003 inch is sufficient for soldering. To this end, the flux applying apparatus, which is the subject of the invention, is directed. The flux applying apparatus is generally referred to by the numeral 16, and is best illustrated in FIGURE 1. The flux applying apparatus 16 includes a source of pressurized flux, generally referred to by the numeral 17, pressurized flux supply line 18, and the requisite number of flux applying nozzles, each referred to by the numeral 19. The source of pressurized flux 17 includes a pressure tank 20 having an inlet 21 for liquid flux. The inlet 21 is normally closed by a cap 22 which is sealed to the inlet 21. A pressurized air line 23 opens into the pressure tank 20, and the flow of air under pressure into the pressure tank 20 is controlled by a pressure regulating valve 24 which is of the adjustable type. The pressure within the pressure tank 20 is indicated by a gauge 25 which is connected to the interior of the pressure tank 20 by means of a pipe 26. The supply line 18 has a fine filter 31.

Each of the flux applying nozzles 19 includes a tubular portion 27 from which a tenuous stream of flux 28 exits. The tubular portion 27 is of a very small internal diameter with the diameter ranging preferably between .004 inch and .015 inch. For example, a .006 inch diameter liquid flux applicator has been used to obtain a .0003 inch thickness flux film upon a .1 inch width flange.

At this time, it is pointed out that the velocity (speed and direction) of the stream of flux 28 should be substantially the same as the velocity of the body blank at which it is being directed. The speed of the flux stream can be determined most simply by measuring the liquid flux flow rate. Thus, with a suitable measuring container in place to collect the output of the flux applying nozzle 19, the output of pressurized flux 17 may be varied as desired by adjusting the pressure regulating valve 24. For example, a flow rate of .21 cubic inch per minute is required, with a .006 inch diameter flux applicator, to obtain the .0003 inch thickness film of flux upon a .1 inch width flanged body blank moving at the speed of 625 feet per minute. Thus, the output of flux can be set substantially equal to that required for the application of the optimum film of flux to the flanges 13 and 14, as well as the laps 15.

Reference is now made to FIGURES 2 and 3 in particular. It will be understood that the tenuous stream of flux 28 has approximately the same velocity as the body blank at which it is being directed. Thus when the flux stream impinges upon the surface of the flanges 13 and 14 and laps 15, it adheres and spreads upon said body blank surfaces because the adhesive force between the applied liquid flux and the underlying body blank surface is greater than both the gravitational force acting upon the applied liquid flux, and the cohesive force present within the applied liquid flux. Thus the flux 28 is spread over the area of the flange 13, as is best illustrated in FIGURES 2 and 3. In this manner, the very thin film of flux 28 required is provided.

Reference is now made to FIGURE 4 wherein one arrangement of flux applying nozzles 19 is illustrated. It is to be noted that one of the flux applying nozzles 19 directs a stream of flux 28 onto the underside of the flange 13, and a second flux applying nozzle 19 directs a stream of flux 28 onto the laps 15. This arrangement of the flux applying nozzles is used for the manufacture of moderately strong can body seams (the laps and only the inner of the three interstices formed between the interhooked and bumped flanges is subsequently soldered). On the other hand, as is illustrated in FIGURE 5, the two flux applying nozzles 19 of FIGURE 4 may be supplemented by an additional flux applying nozzle 19 which directs a stream of flux 28 onto the upper surface of the flange 14. This arrangement of the flux applying nozzles is used for the manufacture of high strength can body seams (the laps and both the inner and outer of the three interstices formed between the interhooked and bumped flanges is subsequently soldered). A third arrangement of flux applying nozzles 19 will be similar to that of FIGURE 5, but in lieu of the flux applying nozzle 19 for the flange 13, this third flux applying nozzle 19 would be positioned adjacent the other two flux applying nozzles for directing a stream of flux 28 onto the body of the blank 10 per se immediately adjacent the flange 14. This is best illustrated in FIGURE 6. It is to be understood that these are only some of the arrangements of the flux applying nozzles 19, and that the arrangements of the flux applying nozzles 19 may be varied to provide the necessary flux film on the various parts of the body blanks. It is also to be understood that the requirements will vary depending upon the particular type of container being formed.

At this time, it is pointed out that the supplying of the flux is in the form of a continuous stream. Thus, when there is no body blank present, or when there is no flange or lap present, the flux 28 will still be delivered. In order to avoid the loss of such flux, a receptacle 29 is provided for each of the flux applying nozzles 19. Each of the receptacles 29 is provided with a drain line 30 for the purpose of returning the flux to a storage receptacle which may be periodically emptied into the pressure tank 20 as it is filled with flux.

A secondary embodiment of the invention is shown in FIGURE 8 in which the stream of flux 28 is shown being directed into the interstitial space 32 of the side seam generally 33, after the body blank 10 has been formed into a tubular shaped can body 10A on a forming horn 34 and has been removed therefrom by means of an overhead conveyor generally designated at 35. The conveyor is comprised of a constantly moving endless roller chain 36 which is mounted for horizontal travel in ways 37—37 which are formed in a pair of magnetic rails 38—38. The can bodies are slidably held onto rails 38—38 against gravitational force by virtue of the rails being permanent magnets. Can body advancing dogs 39 depend at spaced intervals from the roller chain 36 and engage the rear of the can bodies and advance the can bodies along the rails 38—38 toward the viewer as shown in FIG. 8. Flux is delivered by the flux supply line 18 through the rear of the forming horn 34, the line 18 passing through a pipe 40 which extends from the horn 34 in the direction of can body travel. An end of the pressurized flux supply line 18 projects downwardly and in the direction of travel of the can bodies through an opening 41 in the pipe 40 and is fitted with a flux applying nozzle 19. The tenuous stream of flux 28 is directed into the interstitial space 32 and the flux distributes itself in the seam by capillary action. This embodiment of the invention is particularly adaptable to installations where the side seams 33 are subsequently soldered from the inside as taught by Kronquest 1,666,707 or in my co-pending application Ser. No. 730,492, filed April 25, 1958.

From the foregoing, it will be seen that novel and advantageous provision has been made for carrying out the desired end. However, attention is again directed to the fact that variations may be made in the example apparatus disclosed herein without departing from the spirit and scope of the invention, as defined in the appended claims.

I claim:

1. A fluxing apparatus for directly applying a liquid soldering flux in a very thin film to areas of moving can body blanks in advance of a soldering operation without the application of excessive flux, said fluxing apparatus comprising a pressurized source of liquid flux for delivery at a predetermined pressure, a flux applying nozzle, conduit means extending between and connecting said flux applying nozzle to said pressurized flux source for receiving only flux, said flux applying nozzle having a small orifice of a diameter ranging from 0.004 inch to 0.015 inch and delivering said flux in a solid substantially air-free stream, and means supporting said flux applying nozzle for direct application of liquid flux to body blank areas generally centrally of the transverse widths thereof, whereby the quantity of flux delivered to a moving body blank area will spread over a wide area of the body blank as compared to the size of the stream of flux upon impingement of the flux on the body blank due to the adhesive forces between the liquid flux and the surface of the body blank to cover the required area of the body blank.

2. The apparatus of claim 1 wherein flux is delivered from said flux applying nozzle in a constant solid stream, and the apparatus includes a receptacle for catching flux delivered by said flux applying nozzle in the absence of a body blank.

3. The apparatus of claim 1 wherein a filter is disposed intermediate said pressurized flux source and said flux applying nozzle to prevent the passage of foreign matter with said flux of a size which would clog said flux applying nozzle and thus prevent the full flow of flux therethrough.

4. The apparatus of claim 1 wherein the velocity of said flux stream is substantially equal to the velocity of the body blank.

5. The apparatus of claim 1 wherein said flux applying nozzle has a diameter of .006 inch.

6. The apparatus of claim 1 wherein said flux applying nozzle has a diameter of .006 inch, and a filter disposed intermediate said pressurized flux source and said nozzle.

7. The apparatus of claim 1 wherein said pressurized flux source includes a sealed pressure supply tank for the flux, an air pressure line connected to said supply tank, and a pressure regulating valve in said air line maintaining a constant pressure within said supply tank.

References Cited in the file of this patent

UNITED STATES PATENTS

| | | |
|---|---|---|
| 842,926 | Walsh | Feb. 5, 1907 |
| 1,622,781 | Hansen | Mar. 29, 1927 |
| 2,469,392 | Jones et al. | May 10, 1949 |
| 2,870,532 | Young | Jan. 27, 1959 |
| 2,962,995 | Smith | Dec. 6, 1960 |